United States Patent
Wong et al.

(10) Patent No.: US 6,700,340 B2
(45) Date of Patent: Mar. 2, 2004

(54) CONTROL CIRCUIT FOR A COFFEE GRINDER

(75) Inventors: Phillip Boyune Wong, Glen Allen, VA (US); Peter J. McCurdy, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 10 days.

(21) Appl. No.: 10/101,077

(22) Filed: Mar. 19, 2002

(65) Prior Publication Data

US 2003/0178959 A1 Sep. 25, 2003

(51) Int. Cl.[7] .................................................. H02K 7/10
(52) U.S. Cl. ........................ 318/364; 318/466; 318/484; 318/445; 318/446
(58) Field of Search .................................. 318/364, 466, 318/484, 445, 446; 99/280; 200/85

(56) References Cited

U.S. PATENT DOCUMENTS

| | | |
|---|---|---|
| 3,424,919 A | 1/1969 | Howlett |
| 3,575,560 A | 4/1971 | Mayer et al. |
| 4,607,200 A | 8/1986 | Zimmerman |
| 4,645,132 A * | 2/1987 | Fregnan ........................ 241/30 |
| 4,858,522 A * | 8/1989 | Castelli ........................ 99/280 |
| 4,970,948 A * | 11/1990 | Giannelli ..................... 99/280 |
| 5,865,095 A * | 2/1999 | Mulle ........................... 99/293 |

* cited by examiner

Primary Examiner—Karen Masih
(74) Attorney, Agent, or Firm—Akin Gump Strauss Hauer & Feld, LLP (57) ABSTRACT

A control circuit controls a coffee grinder having a grinder motor. The control circuit includes a timer portion and a first switch. The first switch functions as a two-condition switch to place the control circuit in one of (1) an off condition when the first switch is open and the timer portion and the grinder motor are de-energized and (2) a run condition when the first switch is closed, the timer portion is energized, and the grinder motor is energized once in the run condition, the control circuit remaining in the run condition until the timer portion times out or until the first switch is re-opened thereby returning the control circuit to the off condition.

15 Claims, 7 Drawing Sheets

CONTROL CIRCUIT FOR A COFFEE GRINDER

BACKGROUND OF THE INVENTION

The present invention relates generally to a coffee grinder and coffee grinder controls, and more particularly, to a coffee grinder control circuit with a timer and two switches for uniquely controlling the operation of the coffee grinder.

A coffee grinder or coffee mill is an appliance that grinds roasted coffee beans, usually by use of an electrically operated motor. Coffee grinders are well known in the art, but the presently available controls for coffee grinders are generally lacking in safety, functionality and ease of use.

One prior art device, disclosed in U.S. Pat. No. 3,575,560 of Mayer et al, includes an electrically operated coffee grinder having a timer for controlling the length of time the grinder operates. The coffee grinder has a push button that protrudes through an opening in the coffee grinder housing. The push button is connected to a switch that is normally open and can be closed to energize a grinder motor and also is connected to a spring-driven timer mechanism. Depressing the push button closes the switch energizing the grind motor and also winds the spring of the timer mechanism, thereby setting the run time for the grinder. As the spring of the timer mechanism unwinds, the push button returns to its initial position and the grind motor is de-energized. The inner circumferential surface of the push button has a plurality of angularly-spaced grooves of varying lengths that can be placed into registry with a projection in the housing by a rotation of the push button about its longitudinal axis. The length of the grooves determines how far the push button can be depressed and corresponds to different lengths of grinding time as indicated by a scale on the push button. While the Mayer device has a coarse/fine selector switch, the switch is a separate device from a "number-of-cups" setting on the pushbutton which is therefore an additional step for the user. Further, the Mayer device is electromechanical in nature, and therefore requires the user to pull-up a mechanism in order to stop the grinding operation instead of simply releasing a pushbutton or pressing a pushbutton. Additionally, there is no protection for a user who inadvertently opens the top or lid of the grinder during operation, which could be dangerous due to the fast moving blades and the potential for flying debris.

Another prior art device, disclosed in U.S. Pat. No. 4,607,200 of Zimmerman, includes a three-mode electric control circuit for a coffee grinder. The control circuit includes a grinder motor, a three-position control switch having "Off", "On", and "On plus Start" positions, a relay, and a timer. When the control circuit is in a first or "Off" mode, the switch is in the "Off" position and the circuit is completely de-energized. When the control circuit is in a second or "Standby" mode, the switch is in the "On" position and the circuit is partially energized such that a pulse from the timer will actuate and latch the relay. When the control circuit is in a third or "Run" mode, the timer has not timed-out, the relay is actuated and the motor is running. The switch is generally in the "On" position when the control circuit is in the "Run" mode. However, the switch could also be in the momentary "On plus Start" position if the immediately prior mode of the control circuit was the "Standby" mode. A pivot located in the front panel of the grinder serves to actuate the three-position control switch. The Zimmerman device is primarily directed to large or commercial-type coffee grinders which have bag chutes (i.e., the lever) that activate the controls. However, there is no provision for a simple way to end a timed grind circuit by the release of a user operated pushbutton and there is no provision for a safety interlock switch to stop the grind operation in the event that the grinder lid or cover is opened.

What is needed, but not provided in the prior art, is a coffee grinder control circuit that will operate a coffee grinder for a user selectable period of time until the user releases one simple pushbutton, until a user push a simple pushbutton momentarily a second time, or until a safety interlock switch is opened by opening the lid of the coffee grinder.

BRIEF SUMMARY OF THE INVENTION

Briefly stated, the present invention comprises a control circuit that controls a coffee grinder having a grinder motor. The control circuit includes a timer portion and a first switch. The first switch functions as a two-condition switch to place the control circuit in one of (1) an off condition when the first switch is open and the timer portion and the grinder motor are de-energized and (2) a run condition when the first switch is closed, the timer portion is energized, and the grinder motor is energized once in the run condition, the control circuit remaining in the run condition until the timer portion times out or until the first switch is re-opened thereby returning the control circuit to the off condition.

The present invention further comprises a control circuit that controls a coffee grinder having a grinder motor. The control circuit includes a timer portion, a first switch, and a second switch physically separated from the first switch. The switches together function as a two-condition switch to place the control circuit in one of (1) an off condition when one of the first switch and the second switch is open, the other switch is open or closed, and the timer portion and the grinder motor are de-energized and (2) a run condition when both the first and second switches are closed, the timer portion is energized, and the grinder motor is energized, once in the run condition, the control circuit remaining in the run condition until the timer portion times out or until one of the switches is re-opened thereby returning the control circuit to the off condition.

Further, the present invention comprises a control circuit that controls a coffee grinder having a grinder motor. The control circuit includes a timer portion, a safety interlock switch that is actuated to close when a lid on the coffee grinder is closed, and a pushbutton switch. The pushbutton switch is physically separated from the safety interlock switch which must be pushed and maintained by a user to energize the timer portion, and functions in conjunction with the safety interlock switch as a two-condition switch to place the control circuit in (1) an off condition when one of the safety interlock switch and the pushbutton switch is open, the other switch is open or closed, and the timer portion and the grinder motor are de-energized and (2) a run condition when both the safety interlock switch and the pushbutton switch are closed, the timer portion is energized, and the grinder motor is energized, once in the run condition, the control circuit remaining in the run condition until the timer portion times out or until one of the switches is re-opened thereby returning the control circuit to the off condition.

Alternatively, the pushbutton switch, still physically separated from the safety interlock switch, may need only be pushed momentarily by a user in order to energize the timer portion, and functions in conjunction with the safety interlock switch as a two-condition switch to place the control circuit in (1) an off condition when one of the safety interlock switch and the pushbutton switch is open, the other switch is open or closed, and the timer portion and the grinder motor are de-energized and (2) a run condition when both the safety interlock switch and the pushbutton switch are closed, the timer portion is energized, and the grinder motor is energized, once in the run condition, the control circuit remaining in the run condition until the timer portion times out or until the pushbutton is pushed momentarily a second time by the user in order to de-energize the control circuit, or until the safety interlock switch is re-opened thereby returning the control circuit to the off condition.

DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of any device described and designated parts thereof. The terminology includes the words above specifically mentioned, derivatives thereof and words of similar import. Additionally, the word "a" is used in the claims and in the corresponding portions of the specification, means "at least one."

Referring now to the drawings in detail, wherein like numerals indicate like elements throughout, FIGS. 2, 3, 5 and 6 show preferred embodiments of a coffee grinder control circuit, or simply a control circuit in accordance with the present invention.

Figure 1A:
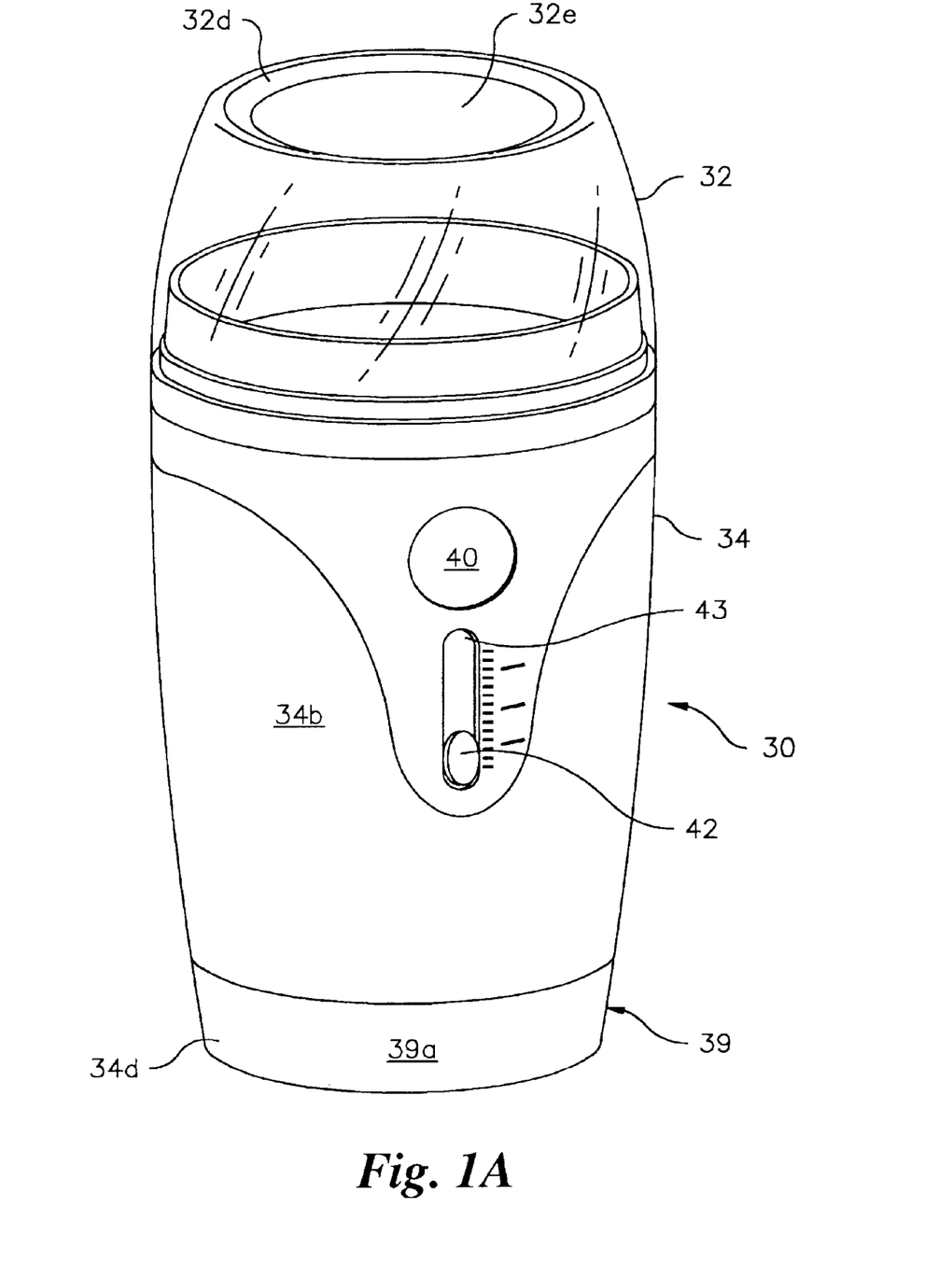
FIG. 1A is a perspective view of a coffee grinder having a coffee grinder control circuit in accordance with the present invention.
Figure 1B:
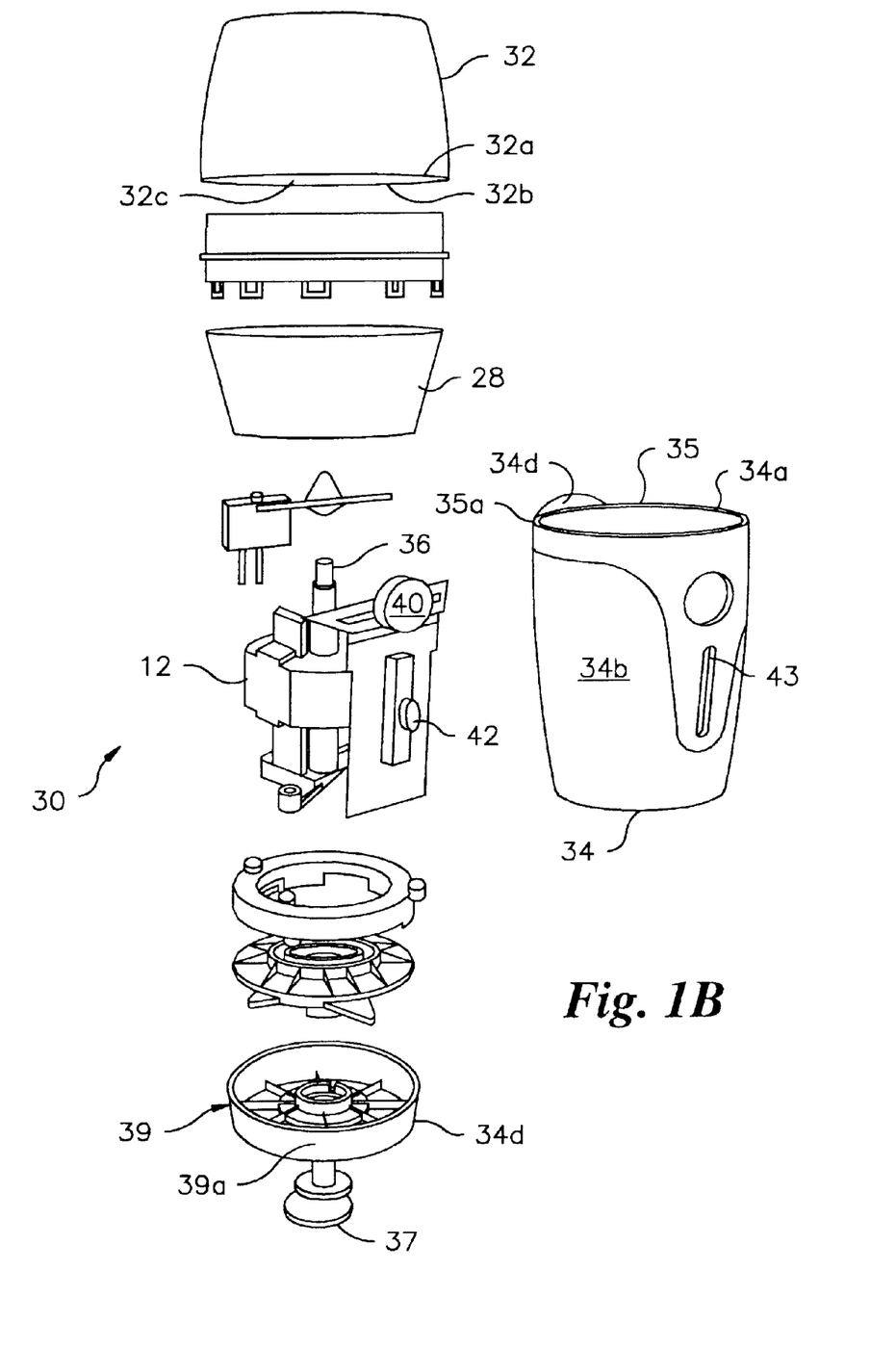
FIG. 1B is an exploded view of the coffee grinder of FIG. 1A.

FIGS. 1A and 1B show a coffee grinder 30 having a control circuit 14 (FIG. 2) in accordance with a first embodiment of the present invention. The coffee grinder 30 described herein is for exemplary purposes only and is only one of many devices suitable for utilizing the control circuit 14 and any other embodiments of the present invention, and should not be considered limiting to the broad scope of the present invention.

Referring to FIGS. 1A and 1B, a base 34 of the Coffee Grinder 30 has the general shape of a vertically oriented, flat-bottomed cylinder with a slightly convex sidewall 34b. A rabbet 35 extends around the outer circumferential edge of the upper end 34a of the base 34. A generally cylindrically-shaped bowl 28 forms a concavity in the upper end 34a of the base 34. A drive shaft 36 of a motor 12 disposed in the base 34 projects into the grind bowl 28. A one-piece blade (not shown clearly) having a hub (not shown) integrally molded thereto is attached by a threaded connection to the drive shaft 36 and is located within the bowl 28. The blade has upwardly angled, diametrically opposed blade tips. An inverted, generally cylindrical, bowl-shaped, cover 32 fabricated from a transparent material is removably supported by the upper end 34a of the base 34. A lower circumferential edge 32a and a lower portion 32b of an inwardly facing side surface 32c of the cover 32 engage the rabbet 35 extending around the upper end 34a of the base 34. Two radially inwardly projecting, diametrically opposed tabs (not shown) attached to the cover 32 rotatably, engage corresponding hooks (not shown) in the vertically extending, outwardly facing sidewall 35a of the rabbet 35 to releasably lock the cover 32 to the base 34.

Figure 4:
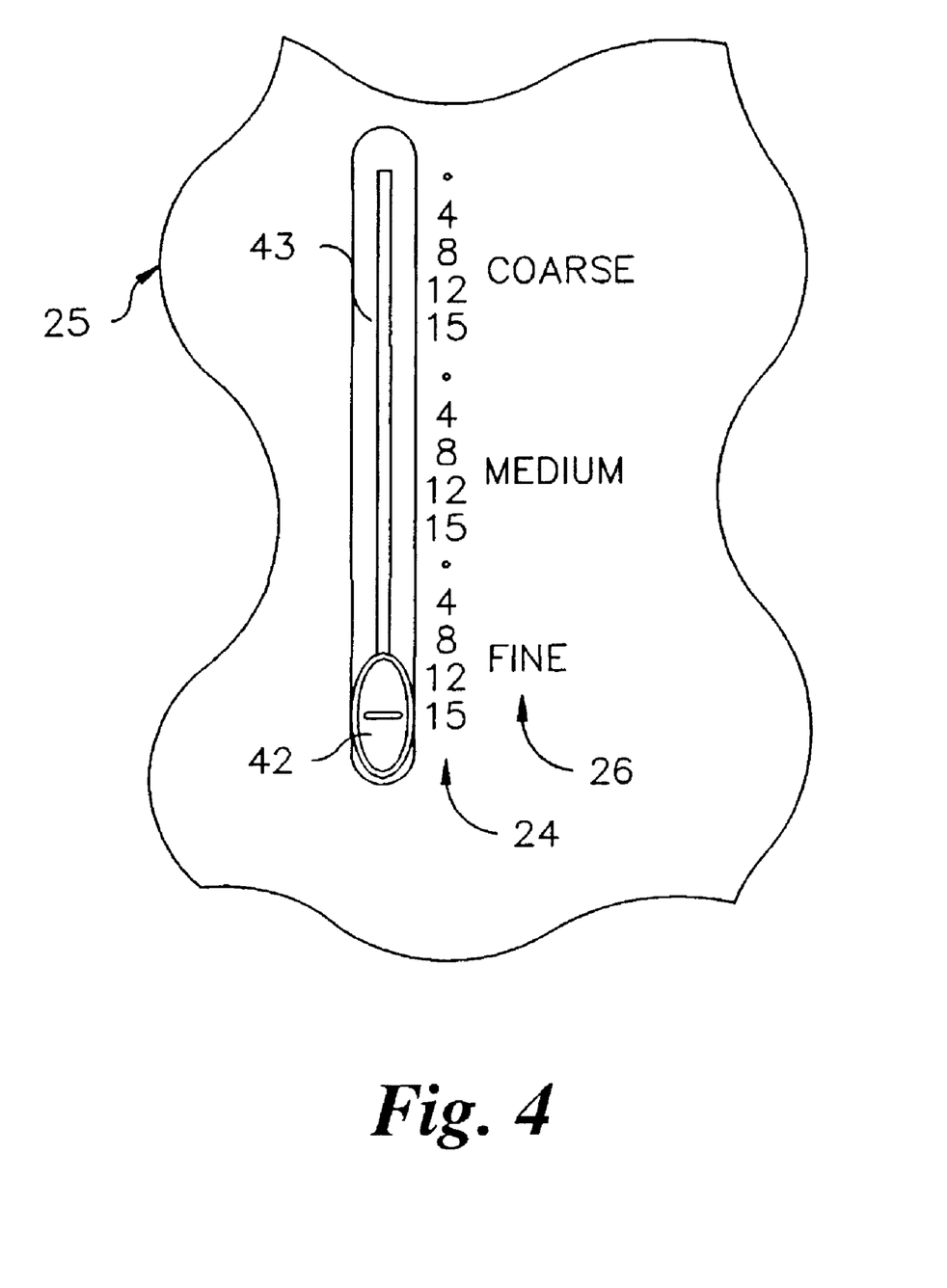
FIG. 4 is an enlarged detail view of a selector switch for use with a coffee grinder circuit in accordance with the present invention.

The lower portion 32b of the outwardly facing side surface 32c of the cover 32 conforms to the profile of the sidewall 34b of the base 34. The top surface 32d of the cover 32 has a centrally positioned, circular-shaped depression 32e therein. A generally circularly-shaped pushbutton 40 spaced from the upper end 34a of the base 34 is mounted flush with the surface of the sidewall 34a of the base 34. An elongated, vertically-oriented slider 42 placed in a slot 43 below the circularly-shaped pushbutton 40 is also flush mounted in the sidewall 34b of the base 34. A scale 25 (FIG. 4) on the body of the coffee grinder 30 adjacent the slot 43 shows the position in which the slider 42 should be placed based on the amount of coffee to be ground and the desired fineness of the grind. The position of the slider 42 determines the amount of time the blades of the coffee grinder 30 rotate. The bottom portion 34d of the base 34 has an inverted cylindrical-shaped bottom cap or cover 39 with an upwardly extending outwardly facing side surface 39a that conforms to the profile of the sidewall 34b of the base 34. The bottom surface (not shown) of the bottom cap 39 is flat and has flush mounted therein a centrally positioned, circular-shaped glamour cap 37.

The coffee grinder 30 has a safety interlock feature that prevents the coffee grinder 30 from operating when the cover 32 is not locked to the base 34 and a timer feature that controls the length of time coffee beans (not shown) in the grinding bowl 28 of the coffee grinder 30 are ground depending on the desired grind 26 (fine, medium, course) and quantity 24 (4, 6, 8, 12 or 15 cups) of coffee to be produced from the grind.

Figure 2:
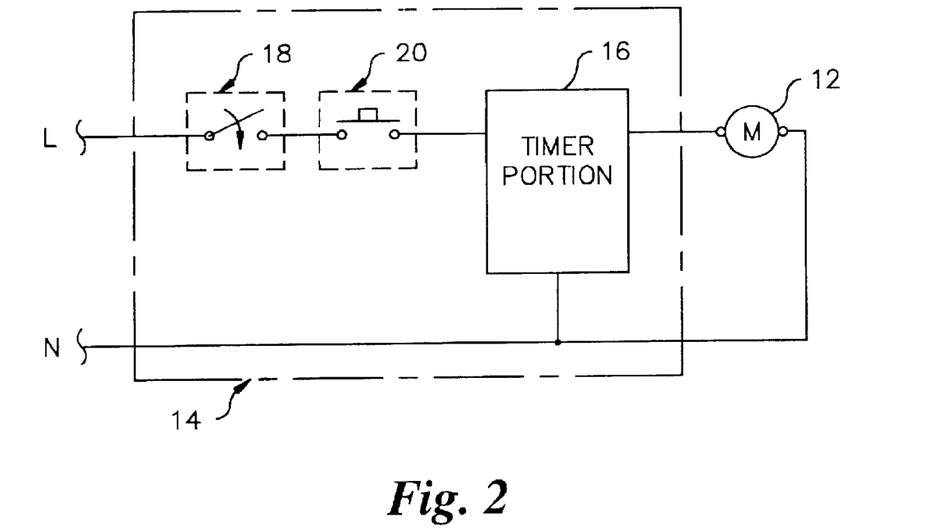
FIG. 2 is a simplified schematic diagram of a coffee grinder control circuit in accordance with a first preferred embodiment of the present invention.
Figure 2A:
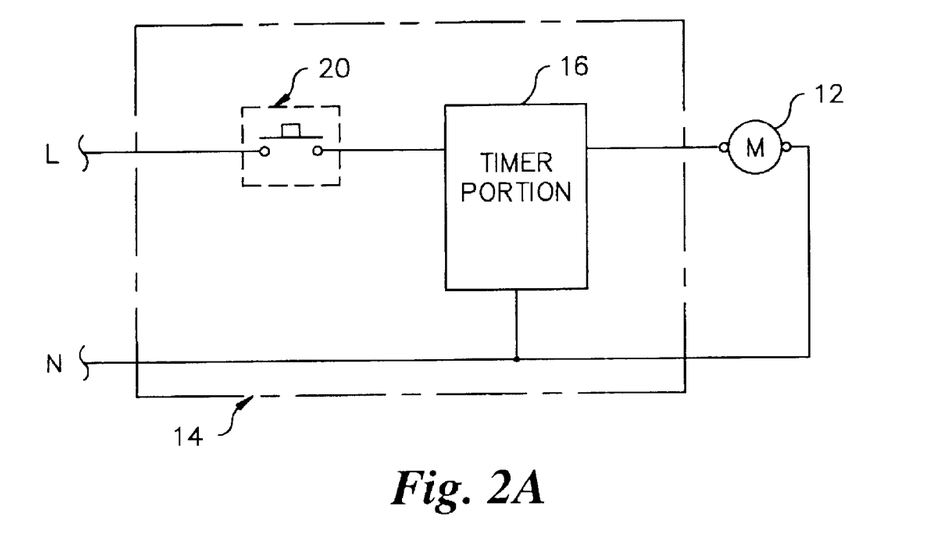
FIG. 2A is a fragmentary view of the control circuit of FIG. 2 without switch 18.

Referring to FIG. 2A, the control circuit 14 in accordance with a first preferred embodiment of the present invention includes a first switch or an on/off pushbutton switch 20 and a timer portion 16. The on/off pushbutton switch 20 is actuated by the circularly-shaped pushbutton 40 in the sidewall 34b of the base 34 of the coffee grinder 30 and is a normally open, momentary-type switch that must be pressed and held in the closed position (by depressing and holding the circularly-shaped button 40) to power the grinder motor 12 for grinding and the timer portion 16 of the control circuit 14. Alternatively, (not shown in FIG. 2) the on/off pushbutton switch 20 is pushed momentarily (pressed and released once) to start the timer portion 16 of the control circuit 14 and to power the grinder motor 12, and is pushed momentarily a second time by the user to interrupt or stop the timer portion 16 and to stop power to the grinder motor 12. In the presently preferred embodiment illustrated by FIG. 2, the length of time for grinding is a preprogrammed timer preset value that is not user adjustable.

In use, the coffee grinder 30 having the control circuit 14 in accordance with the first preferred embodiment is first connected to a power source by plugging a coffee grinder power cord (not shown) into an electrical outlet (not shown). A desired amount of coffee beans is placed in the grind bowl 28 and the cover 32 is placed over the grind bowl 28, rotated and locked to the base 34. Grinding commences by depressing the circularly-shaped pushbutton 40 which actuates the on/off pushbutton switch 20. Such action triggers the timer portion 16 of the control circuit 14 thereby engaging the grinder motor 12 to begin rotation of the blade to grind the beans. The on/off pushbutton switch 20 must be pushed and maintained by the user to energize the timer portion 16 of the control circuit 14. The on/off pushbutton switch 20 functions as a two-condition switch to place the control circuit 14 in (1) an off condition when the on/off pushbutton switch 20 is open and the timer portion 16 and the grinder motor 12 are de-energized and to place the control circuit 14 in (2) a run condition when the on/off pushbutton switch 20 is closed (i.e., the pushbutton 40 is continuously depressed), the timer portion 16 is energized, and the grinder motor 12 is energized. The control circuit 14 remains in the run condition until the timer portion 16 times out or the on/off pushbutton switch 20 is re-opened thereby returning the control circuit to the off condition. Simply, grinding terminates (i.e., the grinder motor 12 and the timer portion 16 are de-energized) when either an accumulated, predetermined runtime in a timer accumulator (not shown) equals the preprogrammed timer preset (i.e., the timer portion 16 times out), when power is removed from the coffee grinder power cord, or when the on/off pushbutton 20 is released by the user. At this time, the timer accumulator resets to zero counts.

Figure 2B:
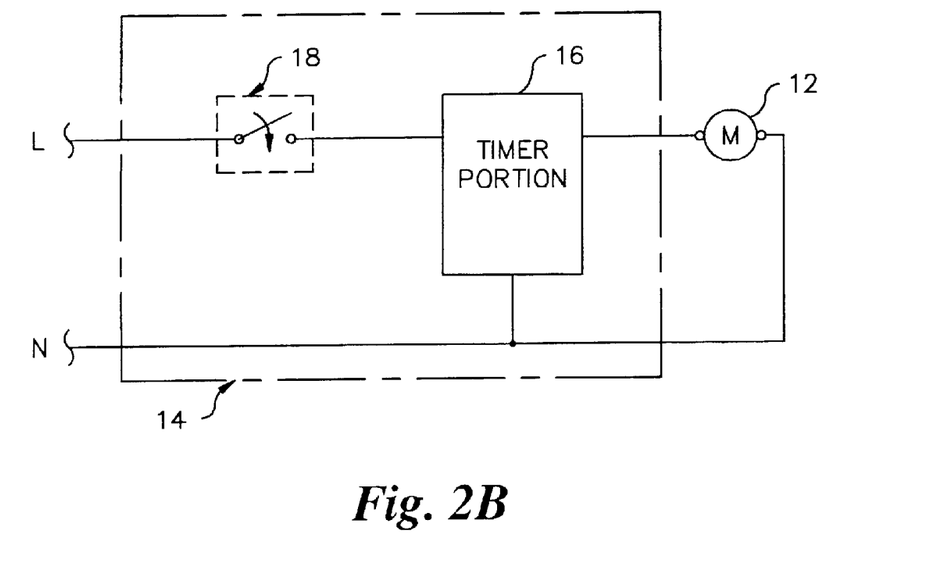
FIG. 2B is a fragmentary view of the control circuit of FIG. 2 without switch 20.

In a first alternate of the first preferred embodiment shown in FIG. 2B, the control circuit 14 includes the timer portion 16 and a second switch or safety interlock switch 18. Preferably, the safety interlock switch 18 is disposed on the upper end 34a of the base 34 of the coffee grinder 30 and is connected in series with the trigger of the timer portion 16. The safety interlock switch 18 is preferably closed by locking the lid 32 to the base 34, but may be actuated by other methods without departing from the scope of the invention.

In use, the coffee grinder 30 having the control circuit 14 in accordance with the first alternate of the first preferred embodiment is first connected to a power source by plugging the coffee grinder power cord into an electrical outlet. A desired amount of coffee beans is placed in the grind bowl 28 and the cover 32 is placed over the grind bowl 28, rotated and locked to the base 34 thereby closing the safety interlock switch 18. Grinding commences by the safety interlock switch 18 and such action triggers the timer portion 16 of the control circuit 14 thereby engaging the grinder motor 12 to begin rotation of the blade to grind the beans. The safety interlock switch 18 must be maintained in the closed position to energize the timer portion 16 of the control circuit 14. The safety interlock switch 18 functions as a two-condition switch to place the control circuit 14 in (1) an off condition when the safety interlock switch 18 is open, and the timer portion 16 and the grinder motor 12 are de-energized and to place the control circuit 14 in (2) a run condition when the safety interlock switch 18 is closed, the timer portion 16 is energized, and the grinder motor 12 is energized. The control circuit 14 remains in the run condition until the timer portion 16 times out or until safety interlock switch 18 is re-opened thereby returning the control circuit to the off condition. Simply, grinding terminates (i.e., the grinder motor 12 and the timer portion 16 are de-energized) when either an accumulated, predetermined runtime (not shown) equals the preprogrammed timer preset (i.e., the timer portion 16 times out), when the lid 32 is opened for any reason thereby opening the safety interlock switch 18, or when power is removed from the coffee grinder power cord. At this time, the timer accumulator resets to zero counts.

In a second alternate of the first preferred embodiment shown in FIG. 2, the control circuit 14 includes the on/off pushbutton switch 20, the timer portion 16 and the safety interlock switch 18. The on/off pushbutton switch 20 is actuated by the circularly-shaped pushbutton 40 in the sidewall 34b of the base 34 of the coffee grinder 30 and is a normally open, momentary-type switch that must be pressed and held in the closed position (by depressing and holding the circularly-shaped button 40) to power the grinder motor 12 for grinding and the timer portion 16 of the control circuit 14. Alternatively, the on/off pushbutton switch 20 is pushed momentarily to start the timer portion 16 of the control circuit 14 and to power the grinder motor 12, and is pushed momentarily a second time by the user to interrupt or stop the timer portion 16 and to stop power to the grinder motor 12. The safety interlock switch 18 is physically separated from the on/off pushbutton switch 20 and is disposed on the upper end 34a of the base 34 of the coffee grinder 30 and is connected in series with the on/off pushbutton switch 20 to the trigger of the timer portion 16. The safety interlock switch 18 is preferably closed by locking the lid 32 to the base 34, but may be actuated by other methods without departing from the scope of the invention.

In use, the coffee grinder 30 having the control circuit 14 in accordance with the second alternate of the first preferred embodiment is first connected to a power source by plugging the coffee grinder power cord into an electrical outlet. A desired amount of coffee beans is placed in the grind bowl 28 and the cover 32 is placed over the grind bowl 28, rotated and locked to the base 34 thereby closing the safety interlock switch 18. Grinding commences by depressing the circularly-shaped pushbutton 40 which actuates the on/off pushbutton switch 20. Such action triggers the timer portion 16 of the control circuit 14 thereby engaging the grinder motor 12 to begin rotation of the blade to grind the beans. The on/off pushbutton switch 20, physically separated from the safety interlock switch 18 must be pushed and maintained by the user to energize the timer portion 16 of the control circuit 14. The on/off pushbutton switch 20 functions in conjunction with the safety interlock switch 18 as a two-condition switch to place the control circuit 14 in (1) an off condition when one of the safety interlock switch 18 and the on/off pushbutton switch 20 is open, the other switch 18 or 20 is open or closed, and the timer portion 16 and the grinder motor 12 are de-energized and to place the control circuit 14 in (2) a run condition when both the safety interlock switch 18 and the on/off pushbutton switch 20 are closed (i.e., the pushbutton 40 is continuously depressed), the timer portion 16 is energized, and the grinder motor 12 is energized. The control circuit 14 remains in the run condition until the timer portion 16 times out or until one of the switches is re-opened thereby returning the control circuit to the off condition. Simply, grinding terminates (i.e., the grinder motor 12 and the timer portion 16 are de-energized) when either an accumulated, predetermined runtime (not shown) equals the preprogrammed timer preset (i.e., the timer portion 16 times out), when the lid 32 is opened for any reason thereby opening the safety interlock switch 18, or when the on/off pushbutton 20 is released by the user. At this time, the timer accumulator resets to zero counts.

In third alternate of the first preferred embodiment, the on/off pushbutton switch 20 is still physically separated from the safety interlock switch 18. However, the on/off pushbutton switch 20 need only be pushed momentarily by the user in order to energize the timer portion 16 and functions in conjunction with the safety interlock switch 18 as a two-condition switch to place the control circuit 14 in an off condition when one of the safety interlock switch 18 and the on/off pushbutton switch 20 is open, the other switch 18 or 20 is open or closed, and the timer portion 16 and the grinder motor 12 are de-energized, and to place the control circuit 14 in a run condition when the safety interlock switch 18 is closed, the on/off pushbutton switch 20 is pushed momentarily closed, the timer portion 16 is energized, and the grinder motor 12 is energized. Once in run condition, the control circuit 14 remains in the run condition until the timer portion 16 times out or until the on/off pushbutton 20 is pushed momentarily a second time by the user in order to de-energize the control circuit 14, or until the safety interlock switch 18 is re-opened thereby returning the control circuit 14 to the off condition. Essentially, grinding terminates when either the accumulated runtime equals the preprogrammed timer preset, when power is removed from the power cord, when the lid 32 is opened for any reason thereby opening the safety interlock switch 18, or when the on/off pushbutton 20 is pushed momentarily a second time by the user. At this time, the timer accumulator resets to zero counts.

Figure 3:
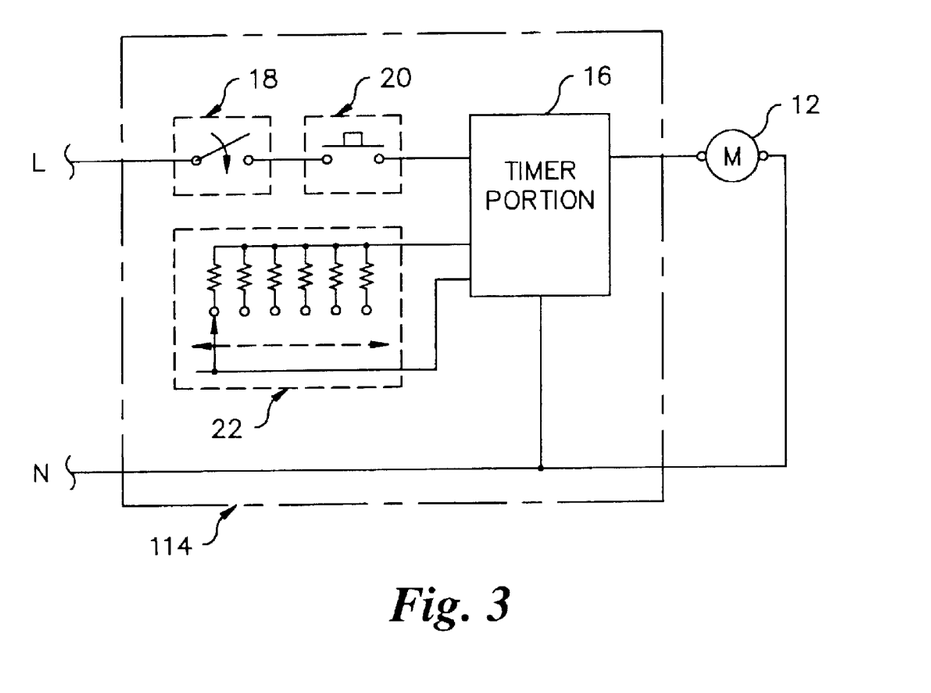
FIG. 3 is a simplified schematic diagram of a coffee grinder control circuit in accordance with a second preferred embodiment of the present invention.

Referring to FIG. 3, a control circuit 114 in accordance with a second preferred embodiment of the present invention includes the on/off pushbutton switch 20, the timer portion 16 and the safety interlock switch 18. The on/off pushbutton switch 20 and the safety interlock switch 18 function in a substantially similar manner as described above in the first preferred embodiment. The control circuit 114 further includes a user adjustable selector 22 actuated by the slider 42 located on the coffee grinder 30 that adjusts an adjustable timer preset (not shown) of the timer portion 16 (which adjusts the operation of the timer) based upon the number of cups of coffee to be produced from beans ground in a particular grinding operation.

In use, the coffee grinder 30 having the control circuit 114 in accordance with the second preferred embodiment is first connected to a power source by plugging the coffee grinder power cord into an electrical outlet. A desired amount of coffee beans is placed in the grind bowl 28 and the cover 32 is placed over the grind bowl 28, and is rotated and locked to the base 34 thereby closing the safety interlock switch 18. After the slider 42 has been positioned for the desired grind 26 and quantity 24 (in other words the adjustable timer preset has been set), grinding commences by momentarily depressing the circular button 40 which actuates the on/off pushbutton switch 20. Such action triggers the timer portion 16 of the control circuit 14 thereby engaging the grinder motor 12 to begin rotation of the blade to grind the beans. Grinding terminates when either the accumulated runtime equals the adjustable timer preset, when power is removed from the power cord, when the lid 32 is opened for any reason thereby opening the safety interlock switch 18, or when the on/off pushbutton 20 is pushed momentarily a second time by the user. In an alternative embodiment, circular button 40 must be pressed and held for grinding. At this time, the timer accumulator resets to zero counts. Alternatively, the control circuit 114 could include just the on/off pushbutton switch 20 and not the safety interlock switch 18 or just the safety interlock switch 18 and not the on/off pushbutton switch 20.

Figure 5:
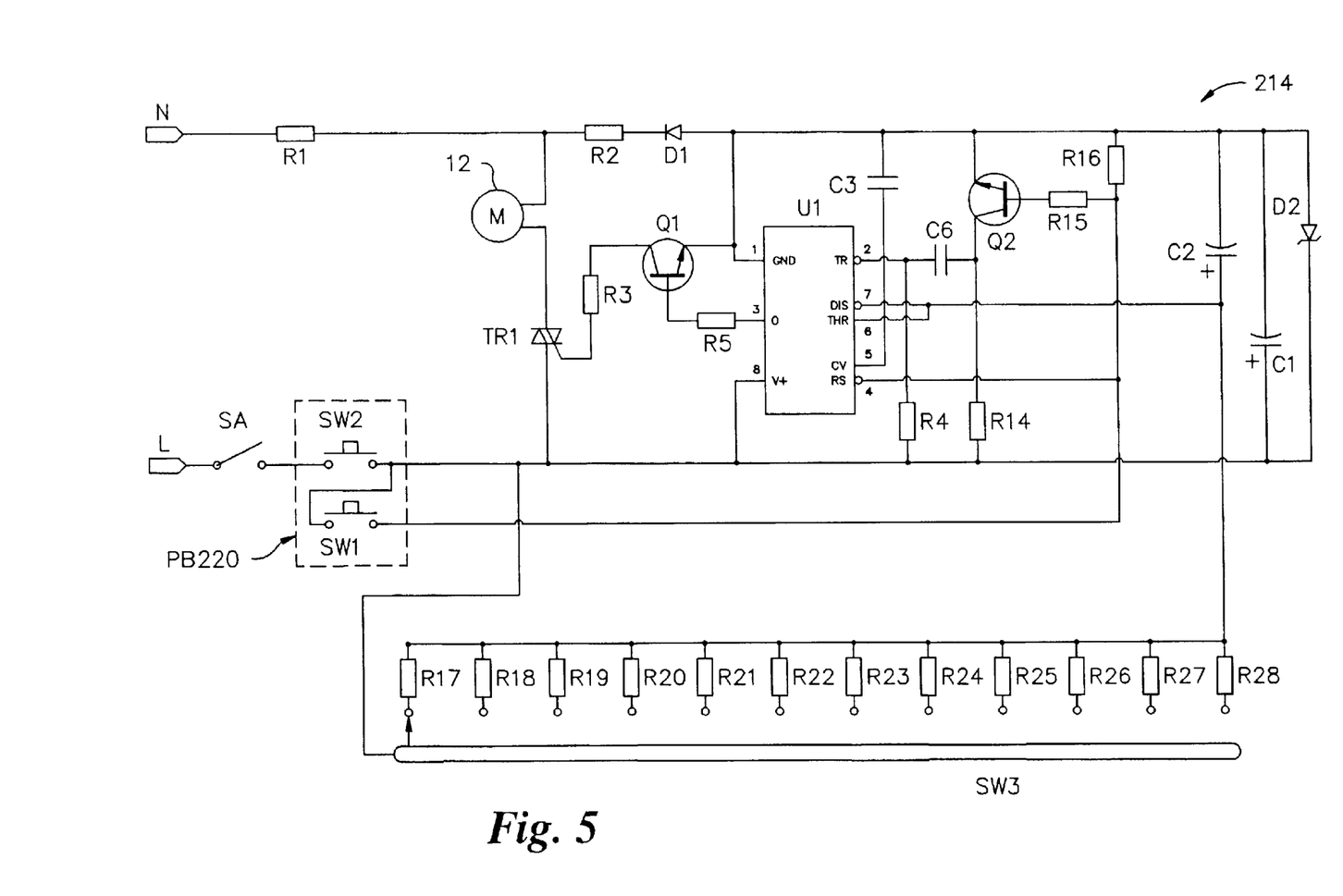
FIG. 5 is a detailed electrical schematic of a control circuit in accordance with the second preferred embodiment of the present invention.

FIG. 5 shows a first detailed way of implementing the second preferred embodiment by way of a control circuit 214 in accordance with the present invention. The control circuit 214 has a safety interlock feature that prevents the coffee grinder 30 from operating when the cover 32 is not locked to the base 34 and a timer feature that controls the length of time coffee beans in the grinding bowl 28 of the coffee grinder 30 are ground depending on the desired quantity 24 (4, 8, 12, or 15 cups, etc.) of coffee to be produced from the grind and the desired grind texture 26 (coarse, medium, fine, or percolator, autodrip, espresso, etc.). The control circuit 214 has control electronics that implement the aforementioned features and includes an on/off pushbutton PB220, a slide switch SW3, a timer integrated circuit (IC) U1 and a safety interlock switch SA. The control circuit 214 further includes suitable biasing components such as resistors R1–R5 and R14–R16, capacitors C1, C2, C3, C6 and diodes D1–D2 as well as suitable control elements such as transistors Q1–Q2 and triac TR1. It should be noted, however, that other components may be used to implement the control circuit 214 without departing from the broad inventive scope of the present invention. Alternatively, the control circuit 214 could be implemented using an application specific integrated circuit (ASIC), a microcontroller, a microprocessor, a programmable array logic (PAL), or the like.

The on/off pushbutton PB220 has two parallel, normally open contacts SW1, SW2. The safety interlock switch SA is disposed at the upper end 34d of the base 34 of the coffee grinder 30 and is connected in series with the on/off pushbutton PB220 to supply power to the various components of the control circuit 214 and especially to a trigger input (TR) of the timer IC U1. The on/off pushbutton PB220 is disposed below the circularly-shaped button 40 in the sidewall 34b of the base 34 of the coffee grinder 30 and is a normally open, momentary-type switch that must be held in the closed position (by depressing and holding the circularly-shaped button 40) for grinding. FIG. 5 shows that the safety interlock switch SA is in series with the series-linked contacts SW1 and SW2 of the on/off pushbutton PB220 and that both SA and PB220 must be closed (actuated) for any electrical power to be delivered to the remainder of the control circuit 214.

The length of the time for grinding is determined by the position of the slide switch SW3 below the slider button 42 (which adjusts the operation of the timer IC U1). The slide switch SW3 is a twelve position resistor bank with a sliding selector switch that aligns with a particular resistor R17–R28 that is used in conjunction with capacitor C2 to form an RC timer network for adjusting the time base of the adjustable timer IC U1. The user selects one of the twelve positions from the combinations of desired grind texture 26 and quantity 24 of coffee to be produced from the grind, such as coarse-2 cups, fine-4 cups, fine-8 cups, etc. Each position has a different resistance value based upon the individual resistor R17–R28 which creates a certain time base for the timer. Since the slide switch SW3 is a resistor bank and not a potentiometer, different discrete positions can be selected to have the same time setting (i.e., equivalent resistance values which determine the time preset) even though they are different physical locations on the switch (i.e., medium-8 cups and coarse-10 cups may both be 10 second times) unlike a slide-wire or potentiometer. However, it should be noted that a slide-wire or a potentiometer or any similar device could be used without departing from the broad scope of the present invention.

The timer IC U1 has an output O that drives (controls the on and off states) the transistor Q1 which in turn drives triac TR1. The triac TR1 gates or switches the power to the grinder motor 12. When the timer IC U1 initially receives power at input V+ and a reset signal at input RS, the output O is set to an on state which turns on the transistor Q1 and the triac TR1, and subsequently, the grinder motor 12. The output O of the timer IC U1 remains in the on state until it counts up to the time base set by the slide switch SW3 and the capacitor C2, and then the output O of the timer IC U1 returns to the off state until power is cycled (off and then on again) to the timer IC U1. The timer IC U1 will not reset, once it has timed out and the output O has been turned off, until power is removed. Thus, another time cycle (grinding operation) cannot be started until power is removed from the timer IC U1 and then power is restored to the timer IC U1. It should be noted, however, that if power is removed while the timer IC U1 is still counting up (i.e., the timer IC U1 has not timed out yet) the output O will immediately be turned off and the timer IC U1 will be reset to zero counts (i.e., the timer IC U1 will count up to the preset time base from zero again the next time power is applied).

In a "before" position, the safety interlock switch SA is disengaged when the cover 32 of the coffee grinder 30 is spaced apart from the base 34. In the "before" position, a slide block, having a bottom contact plate (not shown), is in a rightmost position and is in slidable contact with an L-shaped contact plate (not shown) that is fixed in position. Additionally, a leftmost edge of the slide block is spaced apart from a spring biased contact plate or a pin (not shown). Insertion of a tongue (not shown) projecting downwardly from the lower circumferential edge 32a of the cover 32a into a groove in the slide block and rotation of the cover 32 produces contact between the contact pin and the contact plate of the slide block when the cover is in an "after" or leftmost position. Although the L-shaped contact plate is fixed, in an alternative embodiment the contact plate is attached to and slidable with the slide block.

In use, the coffee grinder 30 having the control circuit 214 in accordance with the presently preferred embodiment is first connected to a power source by plugging the coffee grinder power cord into an electrical outlet. A desired amount of coffee beans is placed in the grind bowl 28 and the cover 32 is placed over the grind bowl 28, and is rotated and locked to the base 34 thereby closing the safety interlock switch SA. After the slider 42 which actuates the slide switch 22 has been positioned for the desired grind 26 and quantity 24 (in other words the adjustable timer preset has been set), grinding commences by depressing and holding down the circularly-shaped button 40 which actuates the on/off pushbutton switch PB220. Such action triggers the timer IC U1 of the control circuit 214 thereby engaging the grinder motor 12 to begin rotation of the blade to grind the beans. Grinding terminates when the accumulated runtime equals the adjustable timer preset, when power is removed from the power cord, when the lid 32 is opened for any reason thereby opening the safety interlock switch SA, or when the on/off pushbutton PB220 is released by the user (even before the timer IC U1 has timed out).

It should be noted that the control circuit 214 could be implemented with a fixed resistance value (not shown) instead of the resistor bank SW3, and would then be a detailed way of implementing the first preferred embodiment.

Figure 6:
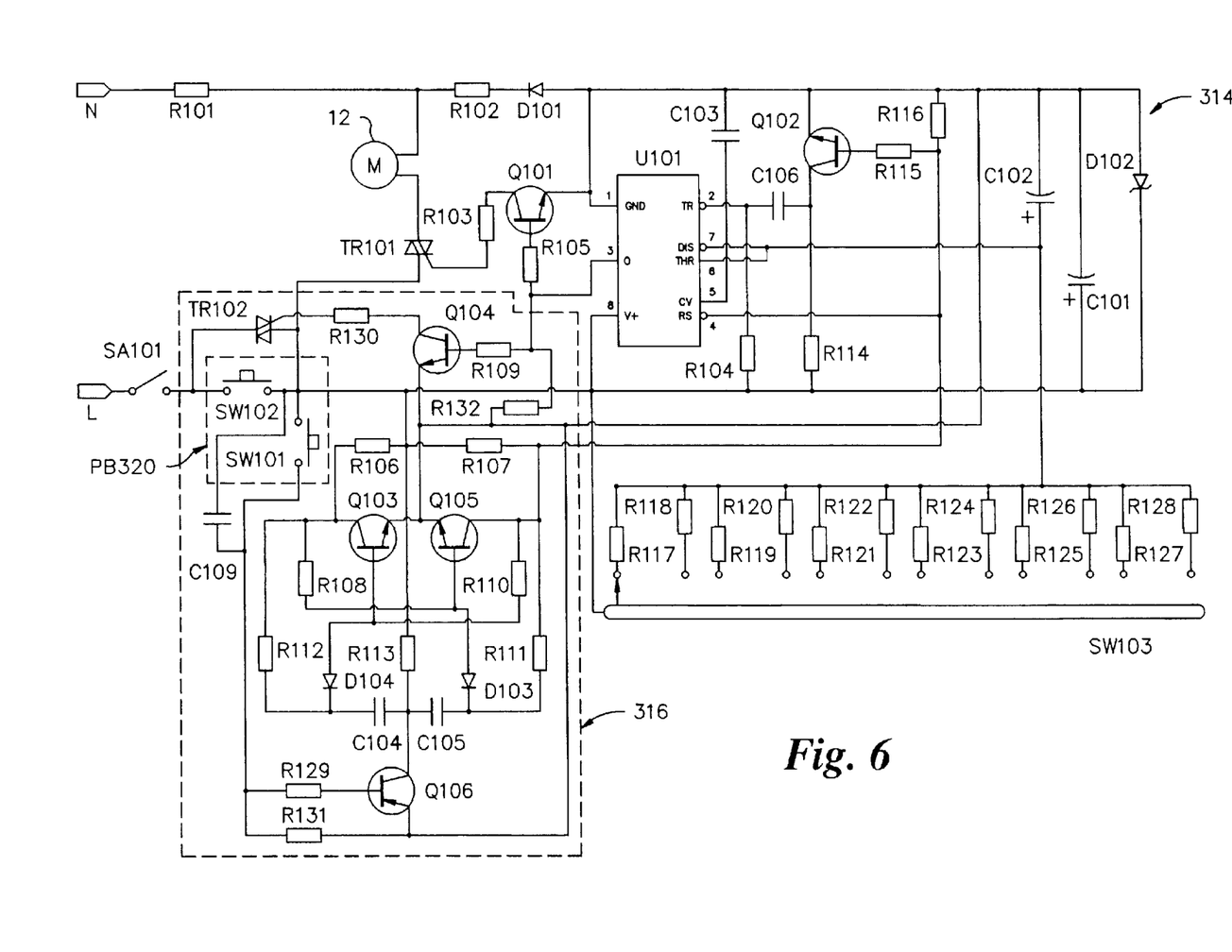
FIG. 6 is another detailed electrical schematic of a control circuit in accordance with the second preferred embodiment of the present invention.

FIG. 6 shows another detailed way to implement the second preferred embodiment of the present invention. Referring to FIG. 6, a control circuit 314 has a safety interlock feature that prevents the coffee grinder 30 from operating when the cover 32 is not locked to the base 24 and a timer feature that controls the length of time coffee beans in the grinding bowl 28 of the coffee grinder 30 are ground depending on the quantity of coffee to be produced from the grind and the desired grind texture. The control circuit 314 has control electronics that implement the aforementioned features and includes an on/off pushbutton PB320, a timer integrated circuit (IC) U101, a slide switch SW103 and an safety interlock switch SA101. The control circuit 314 further includes suitable biasing components such as resistors R101–R116 and R129–R132, capacitors C101–C109 and diodes D101–D104 as well as suitable control elements such as transistors Q101–Q106 and triacs TR101–TR102. It should be noted, however, that other components may be used to implement the control circuit 314 without departing from the broad inventive scope of the present invention. Alternatively, the control circuit 314 could be implemented using an ASIC, a microcontroller, a microprocessor, a PAL, or the like.

The safety interlock switch SA101 is disposed in the upper portion of the base of the coffee grinder 30 and is connected in series with the on/off pushbutton PB320 to the trigger of the timer IC U101. The on/off pushbutton PB320 is disposed below the circularly-shaped button 40 in the sidewall 34b of the base 34 of the coffee grinder 30 and is a normally open, momentary switch that includes a pair of contacts SW101, SW102. FIG. 6 shows that the safety interlock switch SA101 is in series with contact SW102 of the on/off pushbutton PB320. Contact SW101, when momentarily closed by a user depressing the on/off pushbutton PB320 allows a latching or a flip-flop portion 316 of the control circuit 314 to toggle, to energize and "seal-in" triac TR102. Pressing the on/off pushbutton PB320 again prior to the timer timing out will toggle the flip-flop portion 316 again, effectively resetting the circuit and de-energizing triac TR102. Either the on/off pushbutton switch PB320 or the triac TR102 must be closed (gated) for any electrical power to be delivered to the rest of the circuit.

The length of the time for grinding is determined by the position of the slide switch SW103 below the slider 42 (which adjusts the operation of the timer IC U101). The slide switch SW103 is a twelve position resistor bank with a sliding selector switch that aligns with a particular resistor R117–R128 which is used in conjunction with capacitor C102 to form an RC timing network for adjusting the time base of the adjustable timer IC U101. The user selects one of the twelve positions from the combinations of desired grind texture 26 and quantity 24 (FIG. 4) of coffee to be produced from the grind such as coarse-2 cups, fine-4 cups, fine-8 cups, etc. Each position has a different resistance value associated with each of the resistors R117–R128 which creates a certain time base for the timer. Since the slide switch SW103 is a resistor bank and not a potentiometer, different discrete positions can be selected to have the same time setting (equivalent resistance values) even though they are different physical locations on the switch (i.e., medium-8 cups and coarse-10 cups may be 10 second times) unlike a slide-wire or potentiometer. However, the slide switch SW103 could be a rotary potentiometer or slide-wire potentiometer without departing from the spirit of the invention.

The timer IC U101 has an output O that drives (controls the on and off states) the transistor Q101 which in turn drives the triac TR101. The triac TR101 gates the power to the grinder motor 12. The output O of the timer IC U101 also maintains transistor Q104 in an "on" state which gates the power from the triac TR102 to the flip-flop portion 316 and the remainder of the control circuit 314. When the timer IC U101 initially receives power and reset (jumpered together), the output O of the timer IC U101 is set to an on state which turns on the transistor Q101 and the triac TR101, and subsequently, the grinder motor 12. The output O of the timer IC U101 remains in the on state until it counts up to the time base set by the resistance established by the slide switch SW103 and capacitor C102, and then the output O of the timer IC U101 returns to the off state by de-energizing the triac TR101 which in turn de-energizes the grinder motor 12 and by de-energizing the transistor Q104 which toggles off the power passing through the triac TR102 thereby resetting the flip-flop portion 316 of the control circuit 314. Another time cycle cannot be started until power is reapplied to the timer IC U101 by pressing the on/off pushbutton PB320 again. It should be noted, however, that if power is removed while the timer IC U101 is still counting up (i.e., the timer IC U101 has not timed out yet) the output O of the timer IC U101 will be immediately turned off and the timer IC U101 will be reset to zero counts (i.e., the timer IC U101 will count up to the preset time base from zero again the next time power is applied). Power can be removed from the circuit by unplugging (or de-energizing the supply circuit) the coffee grinder 30, by opening the lid thereby opening safety interlock switch SA101, or by pressing the on/off pushbutton PB320 while the grinder motor 12 is running.

In the "before" position, the safety interlock switch SA101 is disengaged when the cover 32 of the coffee grinder 30 is spaced apart from the base 34. In the "before" position, the slide block, having the bottom contact plate is in a rightmost position and is in slidable contact with the L-shaped contact plate that is fixed in position. Additionally, the leftmost edge of the slide block is spaced apart from the spring biased contact plate. Insertion of the tongue projecting downwardly from the lower circumferential edge 32a of the cover 32 into the groove in the slide block and rotation of the cover 32 produces contact between the contact pin and the contact plate of the slide block when the cover is in the "after" or leftmost position. Although the L-shaped contact plate is fixed, in an alternative embodiment (not shown) the contact plate is attached to and slidable with the slide block.

In use, the coffee grinder 30 having the control circuit 314 is first connected to a power source by plugging the coffee grinder power cord into an electrical outlet. A desired amount of coffee beans is placed in the grind bowl 28 and the cover 32 is placed over the grind bowl 28, and is rotated and locked to the base 34 thereby closing the safety interlock switch SA101. After the slider 42 has been positioned for the desired grind 26 and quantity 24 (in other words the adjustable timer preset has been set), grinding commences by momentarily pushing the circularly-shaped button 40 which actuates the on/off pushbutton switch PB320. Such action triggers the timer IC U101 of the control circuit 314 thereby engaging the grinder motor 12 to begin rotation of the blade to grind the beans. Grinding terminates when either the accumulated runtime equals the adjustable timer preset, when power is removed from the power cord, when the lid 32 is opened for any reason thereby opening the safety interlock switch SA101, or when the on/off pushbutton PB220 is pushed momentarily a second time by the user.

It should be noted that the control circuit 314 could be implemented with a fixed resistance value (not shown) instead of the resistor bank SW103, and would then be another detailed way of implementing the first preferred embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A control circuit that controls a coffee grinder, the coffee grinder having a grinder motor, the control circuit comprising:

a timer portion; and a first switch functioning as a two-condition switch to place the control circuit in one of (1) an off condition when the first switch is open and the timer portion and the grinder motor are de-energized and (2) a run condition when the first switch is closed, the timer portion is energized, and the grinder motor is energized once in the run condition, the control circuit remaining in the run condition until the timer portion times out or until the first switch is re-opened thereby returning the control circuit to the off condition.

2. The control circuit of claim 1, wherein the first switch is a safety interlock switch.

3. The control circuit of claim 1, wherein the first switch is a momentary pushbutton.

4. A control circuit that controls a coffee grinder, the coffee grinder having a grinder motor, the control circuit comprising:

a timer portion;

a first switch; and a second switch physically separated from the first switch, the switches, together functioning as a two-condition switch to place the control circuit in one of (1) an off condition when one of the first switch and the second switch is open, the other switch is open or closed, and the timer portion and the grinder motor are de-energized and (2) a run condition when both the first and second switches are closed, the timer portion is energized, and the grinder motor is energized once in the run condition, the control circuit remaining in the run condition until the timer portion times out or until one of the switches is re-opened thereby returning the control circuit to the off condition.

5. The control circuit of claim 4, further comprising a user adjustable selector located on the coffee grinder that adjusts a timer preset of the timer portion based upon a number of cups of coffee to be produced from beans ground in a particular grinding operation.

6. The control circuit of claim 5, wherein the number of cups to be produced is also associated with a desired grind texture.

7. The control circuit of claim 6, wherein the desired grind texture is selectable as coarse, medium, or fine.

8. The control circuit of claim 6, wherein the desired grind texture is selectable as percolator, autodrip, or espresso.

9. The control circuit of claim 5, wherein the selector is a slide switch.

10. The control circuit of claim 4, wherein one of the first switch and the second switch is a safety interlock switch that is actuated to close when a lid on the coffee grinder is substantially closed.

11. The control circuit of claim 10, wherein one of the first switch and the second switch is a pushbutton switch that must be pushed and maintained by a user in order to maintain the control circuit in the run condition.

12. The control circuit of claim 4, wherein one of the first switch and the second switch is a pushbutton switch that need only be pushed momentarily by a user in order to maintain the control circuit in the run condition.

13. The control circuit of claim 12, wherein the control circuit remains in the run condition until the pushbutton is pushed momentarily a second time by the user in order to de-energize the control circuit, or until the other switch is re-opened, thereby returning the control circuit to the off condition.

14. A control circuit that controls a coffee grinder, the coffee grinder having a grinder motor, the control circuit comprising:

a timer portion;

a safety interlock switch that is actuated to close when a lid on the coffee grinder is closed; and a pushbutton switch, physically separated from the safety interlock switch which must be pushed and maintained by a user to energize the timer portion, and functions in conjunction with the safety interlock switch as a two-condition switch to place the control circuit in (1) an off condition when one of the safety interlock switch and the pushbutton switch is open, the other switch is open or closed, and the timer portion and the grinder motor are de-energized and (2) a run condition when both the safety interlock switch and the pushbutton switch are closed, the timer portion is energized, and the grinder motor is energized once in the run condition, the control circuit remaining in the run condition until the timer portion times out or until one of the switches is re-opened thereby returning the control circuit to the off condition.

15. A control circuit that controls a coffee grinder, the coffee grinder having a grinder motor, the control circuit comprising:

a timer portion;

a safety interlock switch that is actuated to close when a lid on the coffee grinder is closed; and a pushbutton switch, physically separated from the safety interlock switch which need only be pushed momentarily by a user in order to energize the timer portion, and functions in conjunction with the safety interlock switch as a two-condition switch to place the control circuit in (1) an off condition when one of the safety interlock switch and the pushbutton switch is open, the other switch is open or closed, and the timer portion and the grinder motor are de-energized and (2) a run condition when the safety interlock switch is closed, the pushbutton switch is pushed momentarily closed, the timer portion is energized, and the grinder motor is energized once in the run condition, the control circuit remaining in the run condition until the timer portion times out or until the pushbutton is pushed momentarily a second time by the user in order to de-energize the control circuit, or until the safety interlock switch is re-opened thereby returning the control circuit to the off condition.

* * * * *